United States Patent [19]

Hamman

[11] 4,304,148
[45] Dec. 8, 1981

[54] CABLE FASTENER ASSEMBLY AND METHOD OF MANUFACTURE

[75] Inventor: Denver C. Hamman, Hinsdale, Ill.

[73] Assignee: Illinois Tool Works Inc., Chicago, Ill.

[21] Appl. No.: 51,310

[22] Filed: Jun. 22, 1979

[51] Int. Cl.³ .................... F16L 3/00; F16B 9/00; F16C 1/10

[52] U.S. Cl. .................... 74/501 R; 74/501 P; 403/197; 248/56; 248/27.3; 248/73

[58] Field of Search .................... 74/501 R, 501 P; 403/197, 269; 248/56, 27.3, 73

[56] References Cited

U.S. PATENT DOCUMENTS

| | | | |
|---|---|---|---|
| 2,954,248 | 9/1960 | Brickman | 74/501 |
| 3,101,205 | 8/1963 | Benham | 74/501.5 R |
| 3,139,768 | 7/1964 | Biesecker | 74/501 |
| 3,366,405 | 1/1968 | Sevrence | 74/501 |
| 3,415,549 | 12/1968 | Chatham | 403/197 |
| 4,131,379 | 12/1978 | Gordy et al. | 74/501 R |

*Primary Examiner*—Kenneth Dorner
*Attorney, Agent, or Firm*—J. R. Halvorsen; T. W. Buckman

[57] ABSTRACT

An all plastic retaining member for fixing an annular cable housing sheath member relative to an apertured workpiece. The basic portions include a stud portion having at least three axially and radially extending leg elements which are connected at one end to a cylindrical body portion having protuberance or shouldered rib means at the opposite end thereof. The opposite end is insert molded in a head portion which is adapted to overlie the apertured workpiece and fixedly accept such sheet member with said stud leg elements engaging the margins of said aperture.

10 Claims, 5 Drawing Figures

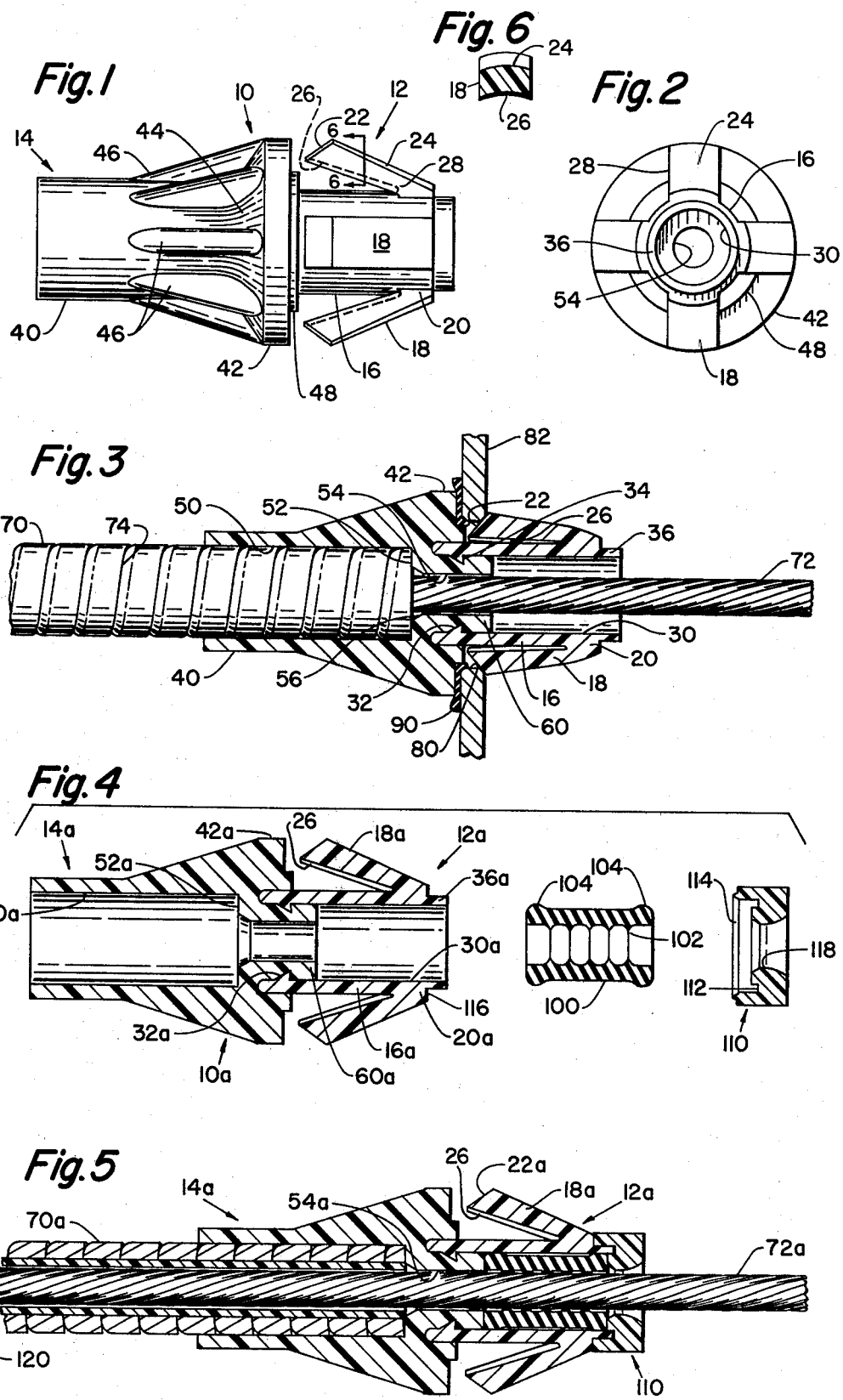

CABLE FASTENER ASSEMBLY AND METHOD OF MANUFACTURE

BACKGROUND OF THE INVENTION

This invention relates to means for fastening a cable housing to a workplate and more particularly, relates to means for fastening a brake cable to a workplate, for example, a workplate such as the brake drum housing or alternatively the firewall to the interior of a motor vehicle. Prior examples of such devices can be found in the following U.S. Pat. Nos. 3,139,768 issued July 7, 1964 to D. L. Biesecker; 3,221,572 issued Dec. 7, 1965 to E. G. Swick; and 3,415,549 issued Dec. 10, 1968 to N. L. Chatham. Such devices were assemblies of sheet metal and plastic or rubber parts which gripped the helically wound housing through which a flexible cable extends. Such assemblies of diverse materials require a large labor factor in their production. The individual parts thereof can be economically produced, however, the assembly cost plus the cost factor of deterioration due to rusting and galvanic action results in an overall undesirable product. Initially such devices functioned well but due to the deterioration thereof ultimate breakdowns resulted.

SUMMARY OF THE INVENTION

The object of the present invention is to provide a brake cable assembly made entirely of plastic materials which is rugged in construction and will additionally withstand the deleterious environment in which such a fastener is located.

To make a fastener of the type contemplated by the present invention with a single pair of retaining legs, can be accomplished as a one-piece unit, however, due to the stresses to which such a fastener is subjected, it has been found that a pair of legs is inadequate for retention purposes. Therefore, to make the fastener strong enough for its intended use the present invention contemplates a two-piece fastener with three or more retaining legs which those skilled in the art will recognize is impossible to manufacture economically as a one-piece unit. An object of the present invention, therefore, is to manufacture the stud or resilient leg portion of the fastener first and then insert mold the stud portion into the head portion. While other fastening means for two plastic elements is available, it will be recognized that by combining the two parts through an insert molding operation and intimate interlock is obtained which would be otherwise unavailable.

Still another object of the invention is to provide an economical, rugged fastener for retaining the cable housing or sheath relative to a workpiece as well as offering alternative embodiments in the same basic design for wiping or sealing the cable as it moves through the sheath or housing.

Other objects will be apparent to those skilled in the art when the following attached drawings are viewed while reading the specifications.

BRIEF DESCRIPTION OF THE DRAWING

FIG. 1 is a side elevational view of a preferred embodiment of the present invention;

FIG. 2 is an end view thereof;

FIG. 3 is a side elevational view in partial section of the preferred embodiment of the present invention in installed position in a workplate;

FIG. 4 is an expanded view of a second embodiment of the present invention;

FIG. 5 is a side elevational view in partial section of the second embodiment of FIG. 4 in assembled relationship; and FIG. 6 is a cross-sectional view of one of the leg elements taken along line 6—6 of FIG. 1.

DETAILED DESCRIPTION

Referring now to the drawing wherein similar parts are designated by similar numerals, an all plastic retaining member 10 of the type contemplated by the present invention includes a stud portion 12 and a head portion 14. As best seen in FIG. 3, the stud portion 12 includes a cylindrical body portion 16 having at least three flexible resilient leg elements 18 extending radially and axially outwardly from their juncture as at point 20 with one end of the cylindrical body 16. The opposite end of each leg element 18 includes a chamfered shoulder means 22 with the outer surface 24 of each leg 18 being curvilinear from side to side and formed on the imaginary surface of the frustum of a cone, as best seen in FIG. 6. Similarly the shoulder 22 is also curved from side to side. The inner surface 26 of each leg is also formed on the imaginary surface of the frustrum of a cone with the base of the cone forming the outer surface 24 and the base of the cone forming the shoulders 22 joining to provide the tapered engaging means illustrated. A major advantage of this arrangement is that when the legs 18 are flexed to enter the aperture in a panel their outer curved surface, from side to side, conforms more readily to the circular aperture than if the outer surface 24 were a straight line which could have a tendency of shearing off the plastic material along the juncture of the outer face 24 and the side surfaces 28. Further, the presentation of a concavity axially disposed along the inner surface 26 permits the legs 18, when flexed radially inwardly during insertion, to embrace the cylindrical body 16 and provide greater radial thickness to the arms 18 for strength purposes.

The cylindrical body 16 has an internal bore 30 which is substantially uniform throughout its axial extent. At the end opposite the point 20 where the legs join the cylindrical body, there are provided a plurality of protuberances or an annular rib 32 having an abrupt shoulder 34 facing the opposite end and with the rib 32 projecting radially into the bore 30. While the body 16 has a substantially uniform wall thickness throughout its extent to the point 20, there is provided a thin wall extension 36 which is coaxial with and projects axially beyond the extremity of body 16 for purposes best set forth hereinafter.

As has been previously mentioned, the stud portion 12 preferably has three or more flexible leg elements 18, in the preferred embodiment there are four legs shown, however, any number of multiple legs greater than two is acceptable. If this device were made with only two legs 18 such legs would have to be of such a size, for their intended use, that it would be virtually impossible to flex the legs or to pass them through the desired aperture in the supporting panel. In this invention the stud portion 12 is injection molded and then transferred to a second die, not shown, mounted on a core pin of a similar size to the bore 30 and insert molded within the head portion 14. Head portion 14 includes a cylindrical section 40, and enlarged flanged 42 and a reinforcing means which in the present embodiment take the form of the radius portion 44 and the reinforcing ribs 46.

Projecting outwardly from the flange 42 is a shear collar 48. As best seen in FIG. 3, the cylindrical section 40 has a first bore 50 which extends generally through a major portion of the head portion 14 and terminates in a shoulder 52. A reduced diameter bore 54 extends through the balance of head portion 14 and is joined to bore 50 by a chamfered area 56. An extension tube 60 extends axially beyond the washer 42 into the bore 30 of the cylindrical body 16. As has been previously indicated, stud portion 12 is insert molded in head portion 14. Thus, the tubular extension 60 intimately and virtually integrally joins and mates with the abrupt shoulder 34 while the free end of the cylindrical body 16 extends into the flange 42 and is positively captured thereby. Thus an integral one-piece fastener is provided that can be economically molded from thermal plastic materials either of identical types or of different types. It will be understood by those skilled in the trade that of course the material used for the stud portion 12 must have the resilient characteristics necessary for proper operation of the flexible leg elements 18 as well as having the desired temperature characteristics capable of withstanding the insert molding technique of forming the entire fastener.

In use of this fastener an annular cable housing sheath 70 which surrounds a cable wire means 72 is inserted into the bore 50 until it strikes the abutment shoulder 52. The cable wire means 72 is fed through the bore 54 and its communicating bore 30 until the cable wire means 72 is adequately extended for attachment at its free end. In the present embodiment it is contemplated that the cable housing sheath member 70 can be retained within the bore 50 either by a press fit, by crimping the wall of cylindrical section 40 to engage the helically disposed grooves 74 in sheath 70; may be adhesively secured or may be sonically welded.

The assembled retaining member 10 and its associated sheath member 70 and cable 72 are axially fed through the aperture 80 in a workpiece member 82 until the flange 42 is adjacent one surface of workpiece 82 and the shoulder means 22 engages the edges of aperture 80 on the opposite surface. If desired, for purposes of preventing ingress or egress of fluids, a resilient sealing washer 90 may be interposed between the flange 42 and the one surface of workpiece 82. The shear collar of 48 serves as a locating means for the sealing washer 90 as well as preventing lateral movement, within the aperture, if the sealing washer 90 is not used.

Referring now to FIGS. 4 and 5 a second embodiment of the invention is disclosed, wherein similar parts will be designated by similar numerals with the addition of the suffix a. Basically the fastener 10a is identical to the first embodiment and includes a stud portion 12a which is insert molded within a head portion 14a by means of the insert molding of the shoulder ring 32a within the tubular extension 60a and the flange 42a.

This embodiment differs from the first embodiment primarily with the addition of a sealing member 100 having a plurality of undulations or rings 102 which are provided with a diameter slightly less than the diameter of the cable wire means 72a and flexible enough to permit axially movement of the cable wire means 72a while providing a sealing engagement with the surface thereof. At either end the diameter of the sealing means 100, as represented by the annular proturberances 104 is slightly greater in diameter than the bore 30a thus the sealing element 100 when inserted into the cavity formed by bore 30a will sealingly engage the walls of bore 30a by the protuberance rings 104 as well as sealingly engaging the cable wire means 72a by the annular rings 102. The specific configuration of this seal is not a novel portion of the present invention. To retain the sealing element 100 a cap 110 is provided that has a groove 112 complimentary to the tubular extension 36a and a chamfered rib 114 for engagement with the free end 116 of the cylindrical body 16 adjacent the juncture 20a of the legs 18a with said body 16a, the cap includes a central double chamfered bore 118 for free movement of the cable wire means 72a therethrough. The assembly of cap 110 to the retaining member 10a is accomplished by sonic welding of the rib 114 to the end surface 116 of the cylindrical body 16a. Other suitable means such as spin welding, adhesive or other snap fastening means would also be appropriate.

Assembly of the annular cable housing sheath member 70a to this embodiment of the invention is substantially identical to the first embodiment. The sheath member 70a is slid into the bore 50a until it bottoms on the abutment shoulder 52a. The cable wire means 72a is then slid through the bore 54a, the sealing rings 102 and the bore 118 of the cap 110. It then can be assembled to an apertured work panel by axially telescoping the resilient legs 18a through the aperture until the shoulders 22a flex outwardly and engage the under surface of the work panel, not shown.

It will be readily appreciated that the use of a sealing member 100 is a matter of choice and dependent upon the environment in which the fastener is to be utilized. If one end of the sheath member 70 or 70a is to be a fixed to a brake drum housing which is subjected to large amounts of water or dust, it is desirable to maintain the lubricity of the cable wire 72 and hence an appropriate seal such as that illustrated by the numeral 100 is desirable. If the end of the cable 72 is used in a relatively clean environment then the added cost of the sealing member 100 and the cap 110 is unnecessary. In many instances the sheath 70 and 70a as best seen in FIG. 5, will employ a plastic tube 120 which serves as a liner to the helically wound sheath 70a, which sheath can be either metal or plastic. Additionally the cable wire means 72a can be coated with a lubricant to insure its relative movement between the sheath and itself.

While it is believed that the method of manufacture has been previously spelled out, it is felt that it should be pointed out that multiple leg stud members which confront a broad base such as the flange 42 are virtually impossible to manufacture in an economical way. The present method of fabricating the stud element 12 permits tooling to come in and form the under surface 26 as well as the cylindrical body 16 and to then readily, economically, insert mold the retaining rib 32 and its abrupt shoulder 34 into the body 14. Assembly, if desired, of the sealing member 100 and the cap 110 are then secondary operations. Each of the initial two stages of this method are carried out by injection molding with suitable known materials such as nylon.

I claim:

1. A plastic retaining means for a brake cable adapted to pass through a hole in a workpiece wherein an annular cable housing sheath member surroundingly disposed to cable wire means for relative movement therebetween is mounted to said workpiece, said retaining means including a hollow stud portion insert molded in a hollow head portion to form an integral unit, said stud portion including a substantially cylindrical body with a pass-through bore, protuberance means extending into said bore adjacent one end thereof, at least three resilient leg elements extending axially and outwardly from adjacent the opposite end of said body, shoulder means at the free end of said leg elements, said head portion including a cylindrical section which blends into an enlarged diameter radially extending flange at one end thereof which is greater than the diameter of said hole, reinforcing means extending between said cylindrical section and said flange, a first diameter bore communicating with said other end of said cylindrical section capable of accepting said sheath member and extending throughout a substantial portion of said cylindrical section, a second bore of lesser diameter generally equal to said cable wire means extending coaxially with said first bore through the balance of said head portion, the juncture of said two bores forming a shoulder means, an extension tube means surrounding said second bore and molded within the bore of said stud portion pass-through bore and intimately engaging said protuberance means and the exterior of said cylindrical body at said one end thereof to form a one-piece retaining means.

2. A retaining means of the type claimed in claim 1 wherein said leg means in transverse cross-section are curvilinear from side to side.

3. A retaining means of the type claimed in claim 1 wherein said leg means have curvilinear outer and inner surfaces falling on imaginary frustums of cones whereby said outer surface is smoothly accepted within a circular hole and said inner surface embraces said body portion when said leg is flexed inwardly during insertion in said hole.

4. A retaining means of the type claimed in claim 3 wherein said shoulder means at the free end of said leg means falls on a third imaginary frustum of a cone whose base is equal to the base of the frustum of a cone defining the outer surface of said legs.

5. A retaining means of the type claimed in claim 1 wherein said cylindrical body of said stud portion forms a hollow chamber, sealing means having a through bore less than the diameter of said cable wire means but capable of accepting said wire means in a sliding seal relationship, and means to retain said sealing means within said chamber.

6. A retaining means of the type claimed in claim 5 wherein said means to retain said sealing means includes a centrally apertured cap having a double reversely tapered bore forming said aperture capable of accepting said cable wire means in sliding relation therethrough.

7. A retaining means of the type claimed in claim 1 wherein said cable housing sheath member is accepted and retained in said hollow head portion by a force fit.

8. A retaining means of the type claimed in claim 1 wherein said cable housing sheath member is fixed relative to said hollow head portion by adhesive means.

9. A retaining means of the type claimed in claim 1 wherein said cable housing sheath member is fixed relative to said hollow-head portion by sonic welding.

10. A retaining means of the type claimed in claim 1 made by the method of injection molding said hollow stud portion, placing the molded stud portion on a core pin with the end of said core pin spaced from said protuberance means, insert molding said head portion and tubular extension into intimate gripping relation with said cylindrical body of said stub portion and said protuberance means to thereby form an integral one-piece retaining means.

* * * * *